US011782773B2

(12) United States Patent
Spector et al.

(10) Patent No.: US 11,782,773 B2
(45) Date of Patent: Oct. 10, 2023

(54) AUTOMATED APPLICATION PROGRAMING INTERFACE IMPORTATION

(71) Applicant: Salesforce, Inc., San Francisco, CA (US)

(72) Inventors: Kirkland Spector, San Francisco, CA (US); Philip Issler, Jr., Apex, NC (US); Barkha Keni, Raleigh, NC (US); Paul Anthony Mason, Port Talbot (GB); Alexander Victor Edelstein, San Francisco, CA (US); Brian Jaffery Tajuddin, Seattle, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/461,894

(22) Filed: Aug. 30, 2021

(65) Prior Publication Data

US 2023/0063160 A1 Mar. 2, 2023

(51) Int. Cl.
*G06F 9/54* (2006.01)
*G06F 9/451* (2018.01)

(52) U.S. Cl.
CPC .............. *G06F 9/543* (2013.01); *G06F 9/451* (2018.02)

(58) Field of Classification Search
None
See application file for complete search history.

(56) References Cited

U.S. PATENT DOCUMENTS

| 7,730,478 | B2 | 6/2010 | Weissman |
| 9,774,572 | B2 | 9/2017 | Mason et al. |
| 9,954,880 | B2 | 4/2018 | Mason |
| 10,212,189 | B2 | 2/2019 | Mason |
| 10,419,451 | B2 | 9/2019 | Mason |
| 10,764,277 | B2 | 9/2020 | Mortimore, Jr. et al. |
| 10,866,959 | B2 | 12/2020 | Palmert et al. |
| 10,908,947 | B2 | 2/2021 | Tajuddin et al. |
| 10,990,694 | B2 | 4/2021 | Chasman et al. |
| 11,228,573 | B1 * | 1/2022 | Rangasamy ...... H04L 12/40006 |
| 2006/0236327 | A1 * | 10/2006 | Lu ........................ G06F 11/3664 |
| | | | 714/E11.207 |
| 2018/0103050 | A1 | 4/2018 | Mason |
| 2018/0152451 | A1 | 5/2018 | Mason |
| 2019/0213061 | A1 * | 7/2019 | Campos-Guajardo ...................... |
| | | | G06F 9/547 |
| 2021/0311776 | A1 | 10/2021 | Tajuddin et al. |
| 2022/0326822 | A1 | 10/2022 | Mason et al. |
| 2022/0326987 | A1 | 10/2022 | Mason et al. |
| 2022/0391383 | A1 | 12/2022 | Yu et al. |
| 2023/0063160 | A1 | 3/2023 | Spector et al. |

* cited by examiner

*Primary Examiner* — Syed A Roni
(74) *Attorney, Agent, or Firm* — Nicholson, De Vos, Webster & Elliott, LLP

(57) ABSTRACT

A system and method for automated application programming interface (API) importation that includes receiving a selection of at least one API provider service of a set of API provider services with API integration support for a platform, retrieving a listing of APIs provided by the selected at least one API provider service, receiving a selection of at least one API from the listing of APIs, and enabling the selected at least one API for a user of the platform, in response to the selection of the at least one API.

21 Claims, 12 Drawing Sheets

Add an External Service

Configure Your MuleSoft Service

Select MuleSoft API

[Q Search APIs...]

| API Name | API Version | API Description |
|---|---|---|
| ○ Contact | 1.0.1 | |
| ○ longDescription | 1.0.0 | |
| ○ SororityNoise | 1.0.0 | |
| ○ SafeBet | 1.0.0 | |
| ○ RealFriends | 1.0.0 | |
| ○ OurPastDays | 1.0.0 | |
| ○ Homesafe | 1.0.0 | |
| ○ FourYearStrong | 1.0.0 | |
| ○ TrashBoat | 1.0.0 | |
| ○ HotMulligan | 1.0.0 | |

Description

[Enter a description...]

Only include supported operations [✓] on

External Service Details

• External Service Name

[Enter a name...]

• Select a Named Credential

[Select a Named Credential...]

[Back]   [Save & NEXT]

FIG. 5

Add an External Service

Configure Your MuleSoft Service

Select MuleSoft API

🔍 Search APIs...

| API Name | API Version | API Description |
|---|---|---|
| ○ Contact | 1.0.1 | |
| ○ longDescription | 1.0.0 | |
| ○ SororityNoise | 1.0.0 | |
| ○ SafeBet | 1.0.0 | |
| ○ RealFriends | 1.0.0 | |
| ○ OurPastDays | 1.0.0 | |
| ● Homesafe | 1.0.0 | |
| ○ FourYearStrong | 1.0.0 | |
| ○ TrashBoat | 1.0.0 | |
| ○ HotMulligan | 1.0.0 | |

Description

This service is powered by the MuleSoft API: Homesafe Version: 1.0.0.

Only include supported operations ✓◯ on

External Service Details
- External Service Name
  [homesafeApi]
- Select a Named Credential
  [anypoint ▽]

[Back]  [Save & NEXT]

FIG. 6

Add an External Service

Select Operations

You can select up to 25 operations and 25 unique objects per registration.

Operations
2 selected out of 25 available

| ☐ | Operation | Description | Input parameters | Output parameters |
|---|---|---|---|---|
| ☑ | getOpen-bankingV1.2Atms1 | This API will return data about all our ATMs and is prepared to... | | 503, 200, 400, 429, responseCode,... |
| ☑ | getOpen-bankingV1.2Atms2 | This API will return data about all our ATMs and is prepared to... | | 503, 429, 400, 200, responseCode,... |
| ☐ | getOpen-bankingV1.2Atms3 | This API will return data about all our ATMs and is prepared to... | | 429, 400, 503, default, 500, respon... |
| ☐ | getOpen-bankingV1.2Atms4 | This API will return data about all our ATMs and is prepared to... | | 500, 429, 400, 503, 408, 200, defau... |
| ☐ | getOpen-bankingV1.2Atms5 | This API will return data about all our ATMs and is prepared to... | | 408, 500, 503, 400, default, 429, re... |
| ☐ | getOpen-bankingV1.2Atms6 | This API will return data about all our ATMs and is prepared to... | | 200, 408, 503, responseCode, 429,... |
| ☐ | getOpen-bankingV1.2Atms7 | This API will return data about all our ATMs and is prepared to... | | 400, 200, default, 503, 500, respons... |
| ☐ | getOpen-bankingV1.2Atms8 | This API will return data about all our ATMs and is prepared to... | | 400, 429, default, 500, 503, 408, 20... |
| ☐ | getOpen-bankingV1.2Atms9 | This API will return data about all our ATMs and is prepared to... | | responseCode, 408, default, 500, 20... |
| ☐ | getOpen-bankingV1.2Atms10 | This API will return data about all our ATMs and is prepared to... | | 503, 429, 400, 500, responseCode,... |
| ☐ | getOpen-bankingV1.2Atms11 | This API will return data about all our ATMs and is prepared to... | | 400, 429, 503, 408, responseCode,... |
| ☐ | getOpen-bankingV1.2Atms12 | This API will return data about all our ATMs and is prepared to... | | 429, 500, 400, 200, 503, default, 40... |
| ☐ | getOpen-bankingV1.2Atms13 | This API will return data about all our ATMs and is prepared to... | | 500, 503, default, 400, 429, 200, 40... |
| ☐ | getOpen-bankingV1.2Atms14 | This API will return data about all our ATMs and is prepared to... | | 408, 200, 500, 503, default, 400, 42... |
| ☐ | getOpen-bankingV1.2Atms15 | This API will return data about all our ATMs and is prepared to... | | 200, 408, default, 503, responseCod... |
| ☐ | getOpen-bankingV1.2Atms16 | This API will return data about all our ATMs and is prepared to... | | default, 400, 200, 500, 503, respons... |
| ☐ | getOpen-bankingV1.2Atms17 | This API will return data about all our ATMs and is prepared to... | | 429, responseCode, 500, 503, defau... |
| ☐ | getOpen-bankingV1.2Atms18 | This API will return data about all our ATMs and is prepared to... | | responseCode, 408, default, 500, 50... |

[Back]   [Next]

FIG. 7

AUTOMATED APPLICATION PROGRAMING INTERFACE IMPORTATION

TECHNICAL FIELD

One or more implementations relate to the field of application programming interface (API) integration; and more specifically, to the automated importing of an API into a platform.

BACKGROUND ART

API is the acronym for Application Programming Interface, which is a software intermediary that allows two applications to talk to each other. Applications that integrate functions of other applications, services or programs utilize APIs. For example, a phone application that provides weather updates may access weather information from a service via an API of the weather service.

The API is type of software interface that defines interactions and offers services between different software applications. A document or standard that describes how to build such a connection or interfaces is referred to as an API specification. Software that meets this standard of the API specification implements or exposes the API. Often the term API is used refer to the API specification and the API implementation. The API can serve to hide the details of or simplify the process of interactions between software.

In the example of the weather application on a mobile phone, the weather application connects to the Internet and sends a request for data (e.g., via a function call) to a weather service (e.g., a particular server that executes the weather service). The server then receives the request, interprets it, performs the necessary actions associated with the request and sends back a response to the weather application on the mobile phone. The weather application then interprets the response (e.g., returned data) and presents the user with the information relevant to the user (e.g., the current temperature at the location of the mobile phone) in a readable way.

An API also provides a layer of security. In the example of the weather application, the mobile phone's data is never fully exposed to the server providing the weather service, and likewise the server is never fully exposed to the mobile phone. Instead, each device communicates with packets of data, sharing only that which is necessary, as defined by the API.

Over the years, what an "API" is has often described any sort of generic connectivity interface to an application. More recently, however, the modern API has taken on some characteristics that make them extraordinarily valuable and useful. Modern APIs adhere to standards (e.g., hypertext transfer protocol (HTTP) and representational state transfer (REST)), that are developer-friendly, easily accessible, and understood broadly. Modern APIs are treated more like products than code. The Modern API can be designed for consumption for specific audiences (e.g., mobile developers), they are documented, and they are versioned in a way that users can have certain expectations of its maintenance and lifecycle.

Because the Modern APIs are much more standardized, they have a much stronger discipline for security and governance, as well as being monitored and managed for performance and scale. The modern API has its own software development lifecycle (SDLC) of designing, testing, building, managing, and versioning. Also, modern APIs are well documented for consumption and versioning.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 5 is a diagram of one embodiment of an interface for API selection.

FIG. 6 is a diagram of one embodiment of an interface for API selection definition.

FIG. 7 is a diagram of one embodiment of an interface for operation selection

DETAILED DESCRIPTION

The following description describes implementations for a process and system for providing a platform that enables developers of applications that utilize the platform to retrieve and ingest application programming interface (API) specifications from the source (i.e., a provider of the associated API) in a guided and automated manner. The ingestion of the API specification enables the developers to easily access and utilize the API in programs developed for the platform. A 'platform' as used herein refers to an execution environment in which a program (i.e., code) is executed. The execution environment can include hardware, operating system, container, application (e.g., a web browser) as well as associated APIs and related supporting software. These execution environments can be hosted in larger cloud computing environments. In some embodiments, the platforms can be provided as part of platform as a services (PaaS) systems where customers of the PaaS systems are able to provision, manage, and execute platforms within the PaaS system as well as applications and/or bundles of applications with platforms. The platform can encompass APIs that are part of the platform and available to applications operating in the platform. Similarly, in PaaS systems and similar cloud computing systems there can be APIs provided by or supported by these encompassing systems that are supported.

However, in addition to these APIs that are part of the platform or associated cloud computing system (e.g., PaaS), developers of applications for these platforms can seek to utilize APIs from additional API providers that can in some cases be external to the platform and in some cases the associated cloud computing system (e.g., the PaaS). For example, an application being developed for the platform can incorporate messaging functions or rely on data provided by a third party service that are accessible by a public API. In these cases, making the APIs of these services accessible is a slow manual task that involves locating the respective API specification, and implementing the relevant aspects thereof.

The embodiments provide a process and system that enable a user to select and ingest these APIs in a declarative fashion rather than programmatically (e.g., via a guided interface rather than via use of JavaScript object notation (JSON) specifications). The embodiments can provide an extensible platform that is able to be implemented to support any number or variety of API providers that enable access to their respective API and/or API specifications.

Figure 1:
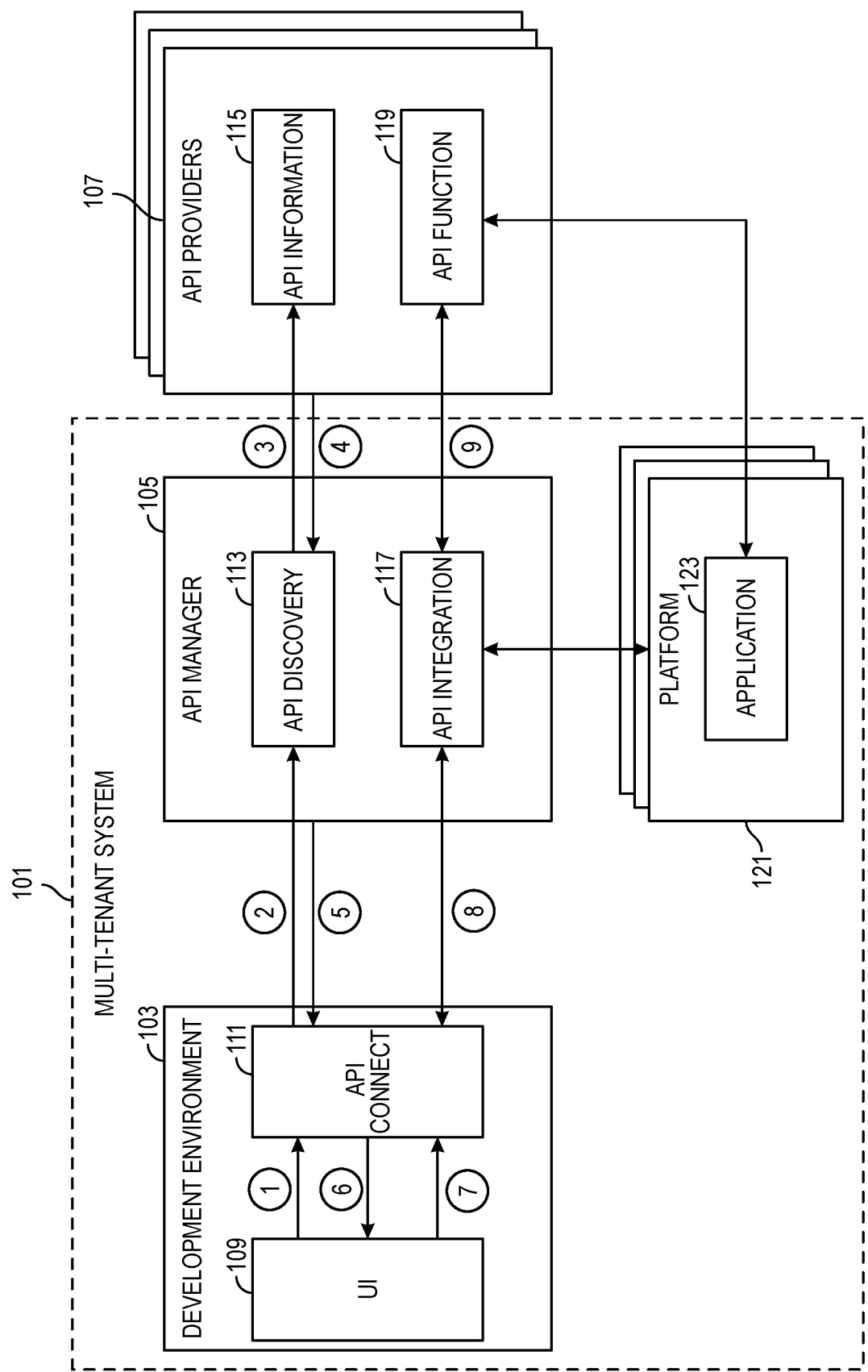
FIG. 1 is a diagram of one example embodiment of an operating environment for an application programming interface (API) ingestion system and process.

FIG. 1 is a diagram of one example embodiment of an operating environment for an application programming interface (API) integration system and process. The API integration (or 'ingestion') system and process can be implemented via a user interface 109 and API manager 105, which can be separate or integrated components. In the example embodiment, the user interface 109 and API manager 105 are separate components. However, this embodiment is provided by way of example and not limitation. One skilled in the art would appreciate that the illustrated and described components can be implemented in different combinations and configurations. Other combinations and configurations can be implemented based on the example embodiments consistent with the principles, structures, and functions as described.

In the example embodiment, a user can interact with a development environment 103 that can support the creation, configuration, and/or development of applications and/or platforms. The development environment 103 can include any number of tools, functions, and user interfaces (UIs) to support the development of the applications and/or platforms. The development environment 103 can include a UI 109 for the API ingestion system and processes. The UI 109 can be a graphic user interface or similar interface than enables a user of the development environment 103 to interact with the API manager 103 and initiate the API integration processes. The UI 109 can initially display with a menu or similar set of options for API sources that are known to the API manager 105. In some embodiments, the UI 109 can also or alternatively enable the user to input a uniform resource locator (URL) or similar identifier of an API specification or API source to initiate the API integration process. In some embodiments, the user can at the same time or subsequently provide a set of credentials for the API integration process. The set of credentials can be a username and password combination, digital signature, or similar credential to identify the user and the user access rights for the platform 121, development environment 103, API provider 107, similar systems, and any combination thereof that verify the access rights of the user to any stage or set of information in the API integration process or enable the API manager 105 to access requisite information for the API integration process.

In some embodiments, the API source selection and/or identification, the credentials and related information are provided to an API connect 111 or similar intermediate software that facilitates interactions between the development environment 103 and the API manager 105 (step 1). Any combination of this information can be passed to the API manager 105 to initiate a request to obtain a list of available APIs from the API provider 107 (step 2). The API manager 105 can in some embodiments include an API discovery component 113 that manages the retrieval of a set of API specifications and related API information from the API provider 107 (step 3). A 'set,' as used herein refers to any positive whole number of items including one item. The API discovery component 113 can utilize a URL or similar identifier of a location of the API specifications and/or related API information 115. The API specifications and similar API information 115 can be made available by the API provider 107 as a JSON file or in any similar format or representation. The API provider 107 responds to the request of the API manager 105 to provide the requested API specifications and related API information 115 (step 4).

The API manager 105, including the API discovery component 113, can process the returned set of API specifications and/or API information 115 to identify each of the APIs that are identified by the returned set of API specifications or set of API specifications. The API discovery component 113 or similar aspect of the API manager 105 can parse the API specifications and API information 115 that are in known formats and/or standardized (e.g., in a JSON format) to identify each of the APIs provided by the API provider 107. Similarly, the API manager 105, including the API discovery component 113, or other components can parse the API specifications and API information 115 to identify additional information related to the supported APIs including listing of the operation or functions of the APIs, input/output and similar parameter information for operations and functions, and similar information relevant to the use of the API.

Any combination or subset of the identified information from the set of API specifications or information 115 or the complete set of API specifications and information 115 can be returned by the API manager 105 and/or the API discovery component 113 to the development environment 103, API connect 111, and UI 109 (step 5 and 6). In other embodiments, the API manager 105 and/or components thereof can be integrated with the UI 109 or can directly interact with or provide the UI 109. Similarly, in some embodiments, the API connect 111 or similar intermediate software can implement the parsing of the retrieved API specifications and information 115, as described herein above in relation to the operation of the API discovery component 113 and API manager 105.

The UI 109 can display the set of available APIs provided by the API provider 107 as parsed and returned to the UI by the API connect 111, API manager 105, or as provided by the API provider 107. A user (e.g., a developer or administrator) can then select any number and combination of the APIs provided by the API provider 107 via the UI 109. The UI 109 can then further display a set of functions, operations, features, configuration, and other options related to the selected APIs based on provided API specification and API information 115 that has been parsed by the API manager 105 and/or related components. In some embodiments, the user can is shown available versions of the APIs and/or API functions, operations, features, configurations, and other options. The UI 109 can provide selection and configuration options through any number of menus, screens, or similar user interface elements. Examples of these interfaces are further described herein below in relation to FIGS. 3 to 8. The selections of the APIs, operations, and related features can be collected from the UI 109 and provided to the API connector 111, and/or API manager 105 to enable access and operation of the selected APIs and associated operations, functions, features, and related options by a set of platforms 121 and/or applications 123 being developed to be deployed in a cloud computing system (e.g., in a multi-tenant system 101). The API manager 105 can include an API integration component 117 that configures the cloud computing system (e.g., multi-tenant system 101), platforms 121, and related software that support applications 123 to enable access to the API functions 119 provided by the API provider 107. This can entail establishing appropriate permissions, secure communication links, and related operations requisite for the applications 123 to utilize the API functions 119.

Figure 2:
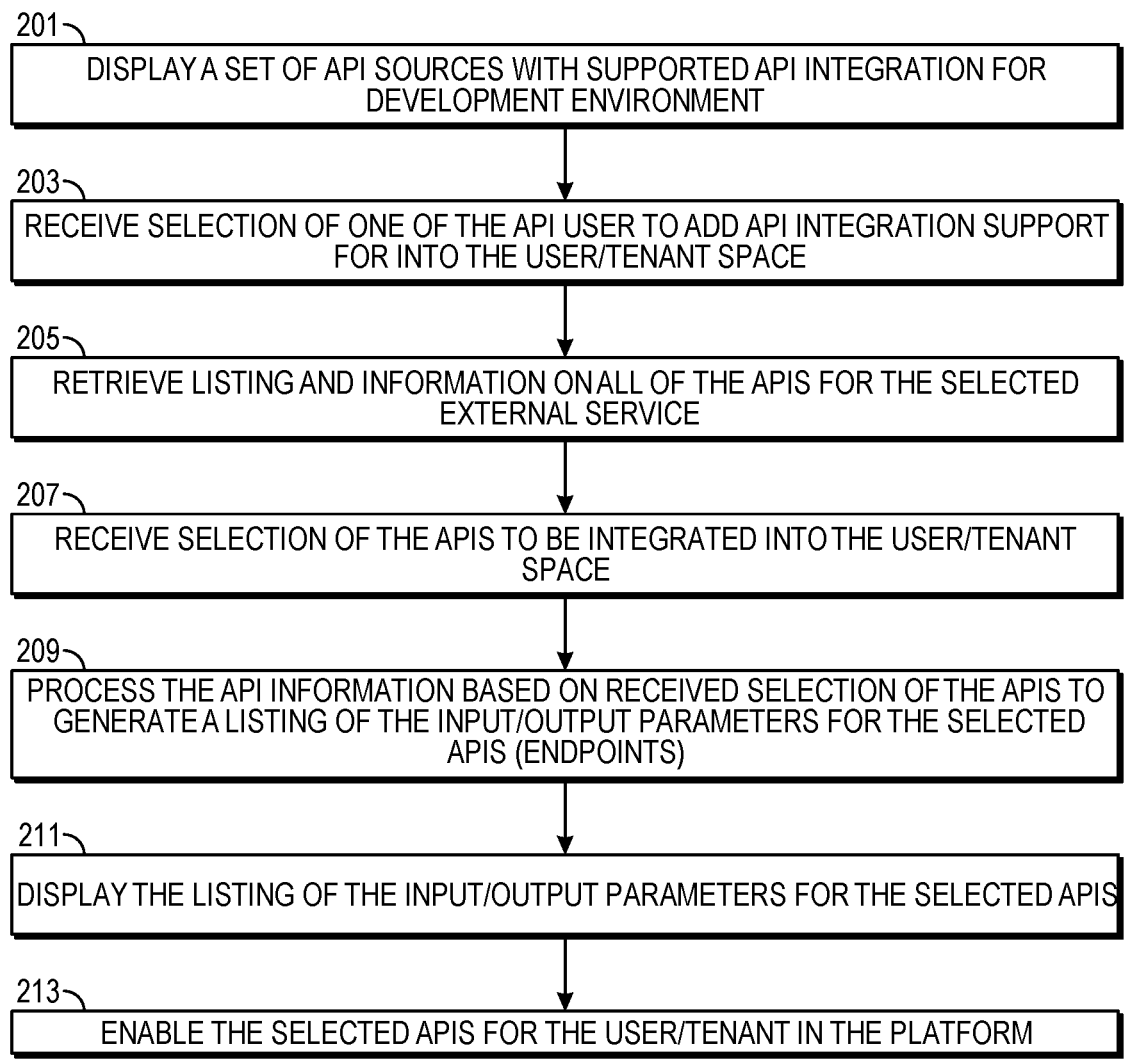
FIG. 2 is a diagram of one embodiment of a process of an API manager.
Figure 3:
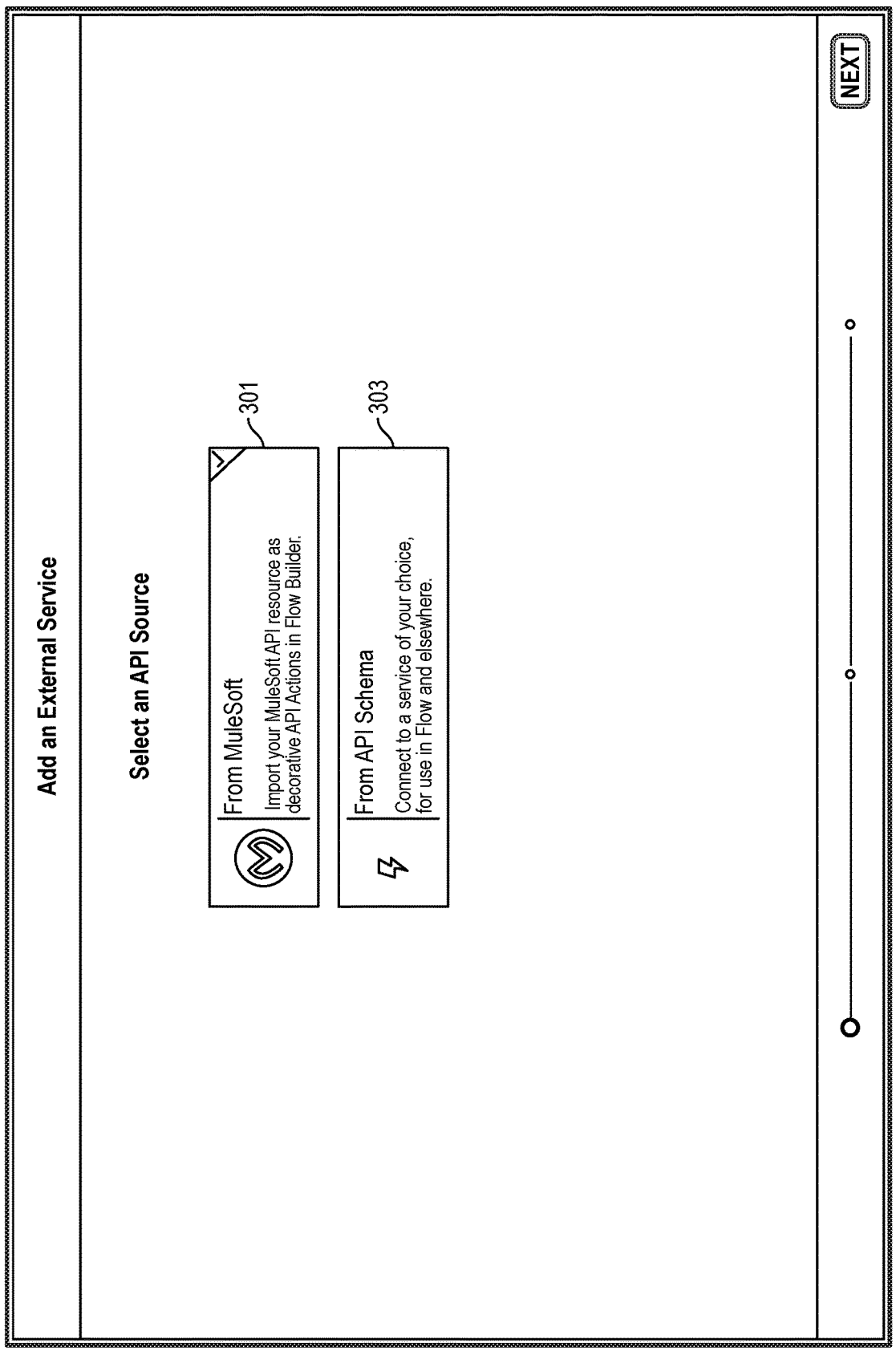
FIG. 3 is a diagram of one embodiment of an interface for API source selection.

FIG. 2 is a diagram of one embodiment of a process of an API manager. In this example embodiment, the API manager operates in connection with a UI in the development environment and other intermediate components to enable API integration. The process can be initiated in response to a user of the development environment accessing a user interface of the API manager. The API manager displays or causes to be displayed a set of API providers via the UI (Block 201). An example of the API provider interface is shown in FIG. 3. FIG. 3 is a diagram of one embodiment of an interface for API source selection. In the illustrated example interface of FIG. 3, the interface lists known API sources (e.g., MuleSoft APIs) 301, as well as provide an option for specifying an unknown API source (e.g., an API specification or schema location) 303.

Figure 4:
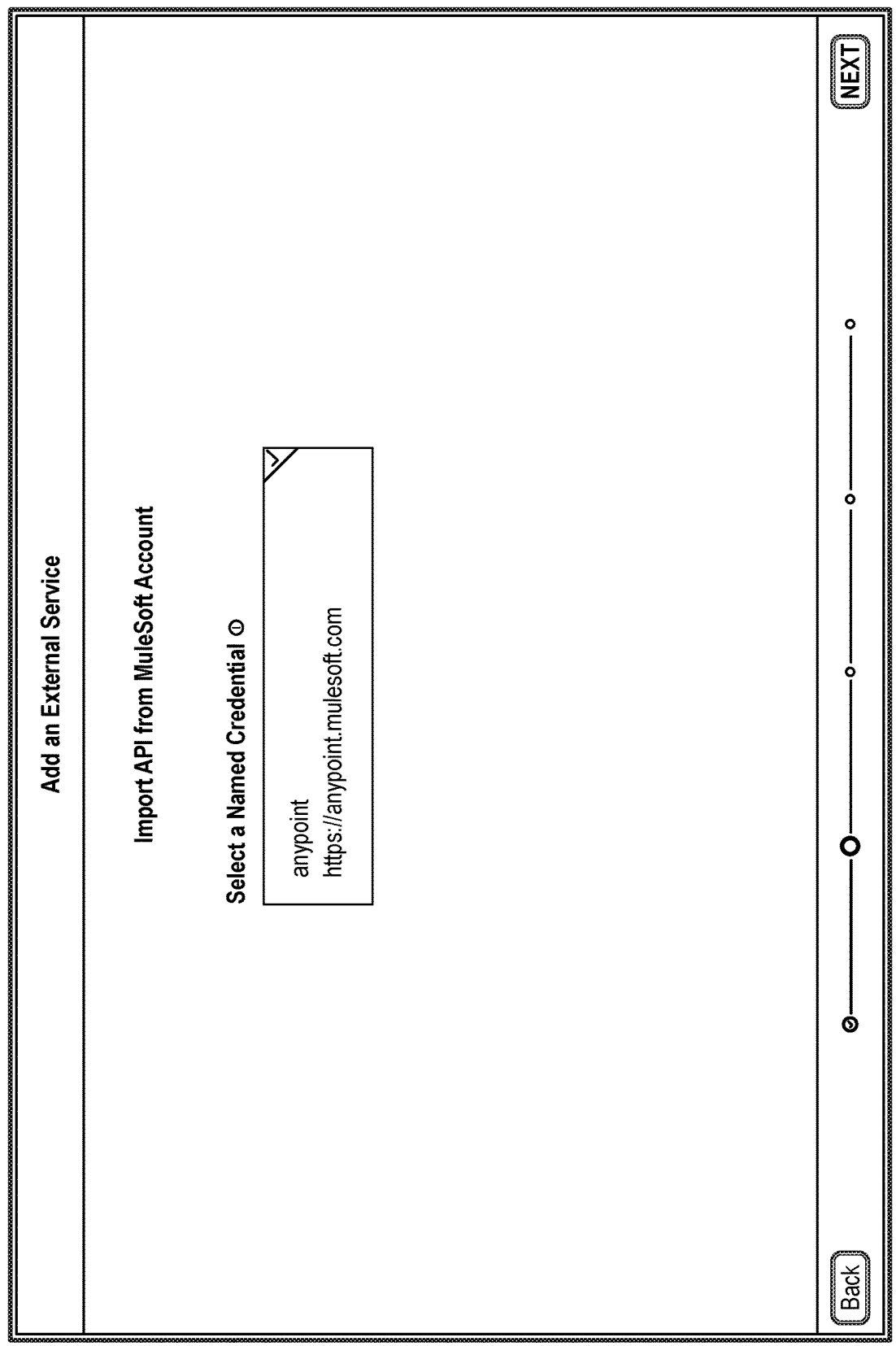
FIG. 4 is a diagram of one embodiment of an interface for credential selection.

The user can select one of the displayed API source options to initiate the process for adding API integration support for a platform and/or application managed by the user (Block 203). In some embodiments, where the user is developing an application of platform in a multi-tenant system the API integration can be directed to the user or tenant space and applications that operate therein. FIG. 4 is a diagram of one embodiment of an interface for credential selection. As shown in FIG. 4, the user interface can also request credentials from the user to access the API specification or scheme or other related resources (e.g., the tenant space of the multi-tenant platform) to enable the API manager to access the requisite resources and determine permissions related to the API integration. The credentials can be any type of user verification information or process including password and username information that is provided directly to the API manager or where the user specifies the verification system or credential manager e.g., by providing a URL.

In response, the API manager sends a request or similarly accesses the resources of the API provider to access a listing of API specifications, schemas, and related information (Block 205). The API provider services the request, or the API manager fulfills the request to obtain the API specifications, schemas, and/or related information. The API manager can receive a selection of APIs that can be integrated into the system, platform, or applications and that are identified in the requested set of API specifications, schemas, and related information (Block 207). An example of the user interface for the API selections from a selected API provider is shown in FIG. 5. FIG. 5 is a diagram of one embodiment of an interface for API selection. Additional information and selection information can include the API name, version, and description. A user can filter the APIs based on integration characteristics including support for integration. A user can select any number or combination of the APIs for integration. Selection of one of the APIs is shown in FIG. 6. FIG. 6 is a diagram of one embodiment of an interface for API selection definition. The user interface can enable further user specific definition or description as well as identification of related credentials. In some embodiments, with the selection of the operations and/or APIs via the UI, the user is offered a list of existing named credentials or the option to create of a new named credential. In this example, the auto-creation of new named credentials as specified by the user is shown, in other embodiments the user can be presented with a list of existing ones (e.g., as a drop down or similar interface element). The API manager attempts to create and save a new piece of metadata, using the schema and the named credential name. Successfully doing this will result in the generation of a set of invocable 'action.'

Either in response to the selection of the APIs to be integrated or in response to receipt of the API specification, schemas, and information, the API manager or related component can process the API specification, schemas, and information to identify the listing functions, configuration, operations, features, and similar options related to the selected APIs to be integrated. These options can be presented to the user as a listing as shown in FIG. 7. FIG. 7 is a diagram of one embodiment of an interface for operation selection. In the example interface the user has selected a set of operations to be integrated from a selected API. The interface displays an identifier for the operation, description, input parameters, and output parameters. Any number or combination of the operations can be selected.

Figure 8:
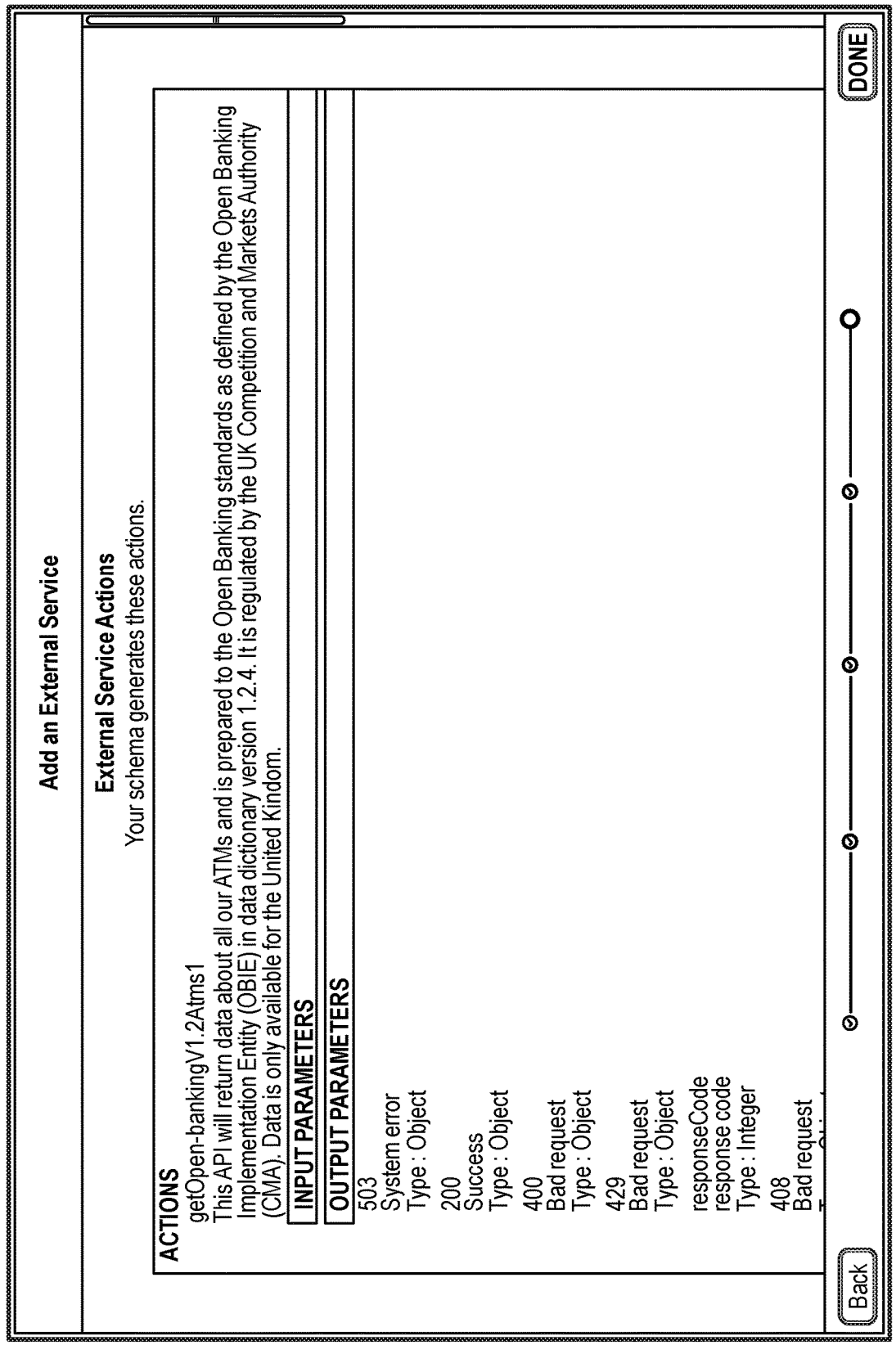
FIG. 8 is a diagram of one embodiment of an interface for API service action description.

With the selection of the API to be integrated and specific operations, features, functions, objects or other options to be integrated from the selected API, the API manager can generate an interface to display a listing of the input/output parameters for the selected API and/or API operations along with related information (Block 211). FIG. 8 is an example embodiment of the identified API actions, which provides a summary of the integration to be enabled for the selected APIs and the relevant information for utilizing the integrated operations, features, objects, functions, and similar aspects of the selected APIs. FIG. 8 is a diagram of one embodiment of an interface for API service action description. In the example illustrated user interface the set of integrated service action, i.e., the operations and features selected of integration are displayed including a name and description of the 'actions' that can subsequently be utilized declaratively in applications of the platform. In addition, the input and output parameters are listed.

Figure 9:
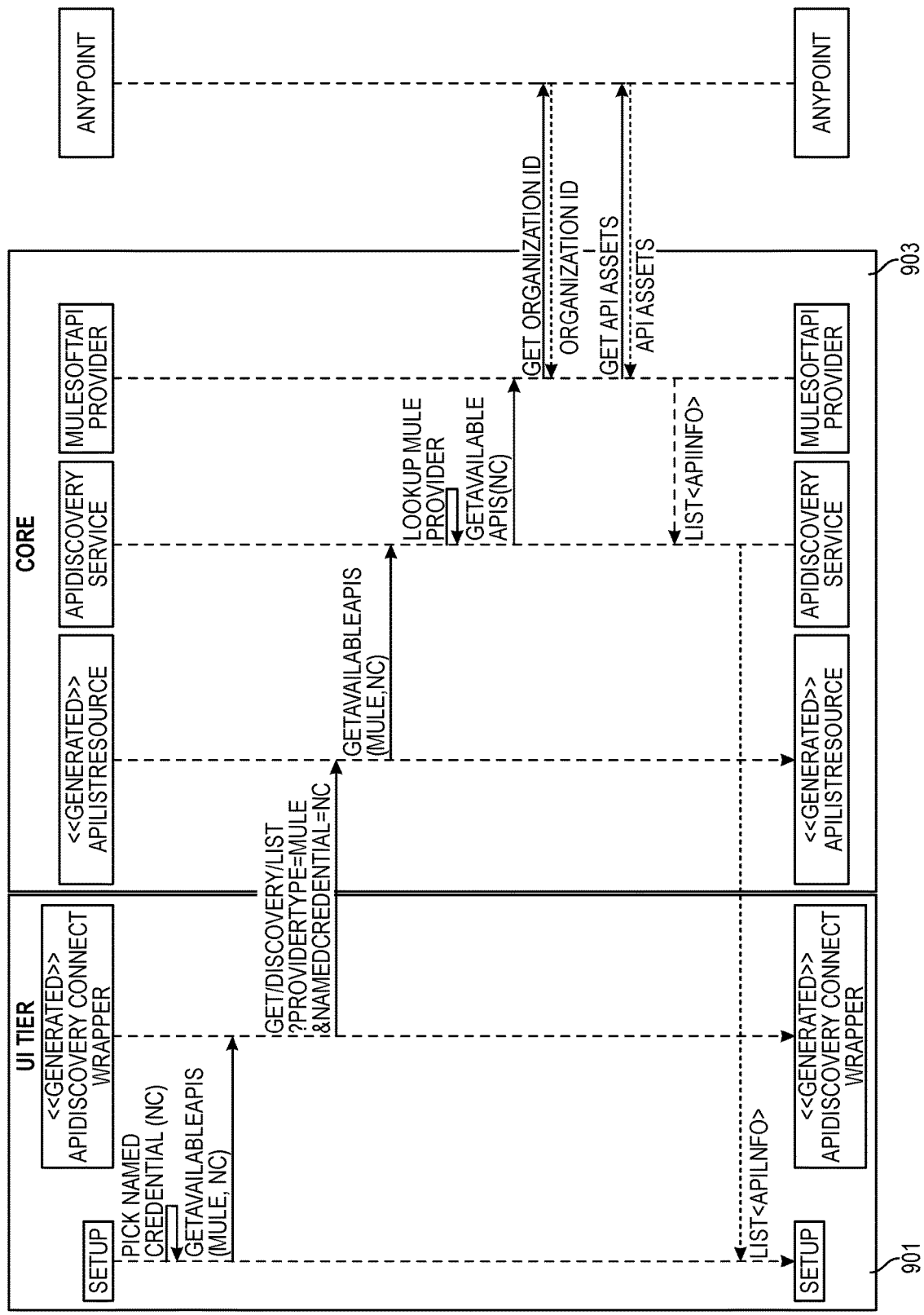
FIG. 9 is a flowchart of one embodiment of a process for fetching an API.

FIG. 9 is a flowchart of one embodiment of a process for fetching an API. In the example, the user is selecting to import a MuleSoft API into the platform. The process is implemented by a UI tier (e.g., a separate UI module) 901 and a core 903 (e.g., an API manager). The UI tier 901 can include a setup component that manages the interfaces for displaying options and collecting user selections for API integration. The setup component can receive API source selection, determine the credential options and display them (pick names credential) then call an API discovery connect component ('getAvailableAPIs') where the selected API source (e.g., 'mule') and selected credential (e.g., 'nc') are provided as inputs. The API discovery connect generates a request to the core (e.g., GET/discovery/list?providerType=mule&namedCredential=nc). The APIListResource function receives the GET and in turn generates a request via a getAvailableApis where the source ('mule') and named credential ('nc') are provided as inputs to an APIDiscovery service.

The API discovery service performs a lookup of the API source ('lookup Mule provider') and retrieves the APIs from the API source ('getAvailableApis(nc)'). In this example, the MuleSoftAPIProvider component an API source specific component in the core 903 can service this request and interact with the API source, in this example 'Anypoint' server in a manner specific to the API source. In the illustrated example, the core 903 via the MuleSoftAPIProvider calls a 'get organization ID' and receives an organization identifier from the Anypoint server, then the API assets (e.g., a JSON representation of the API specification) can be requested. The example API source 'Anypoint' returns the requested API assets such as information of the API specification and related API information. A list of the APIs provided by the source and related API information is then returned to the APIDiscoveryService, which in turn passes this information back to the setup component of the UI tier 901 to be displayed. The List <APIInfo> or any subset thereof can then be displayed to the user for selection of the API for integration as well as specifics related to the functions, operations, objects, and other options related to the API to be integrated.

Figure 10:
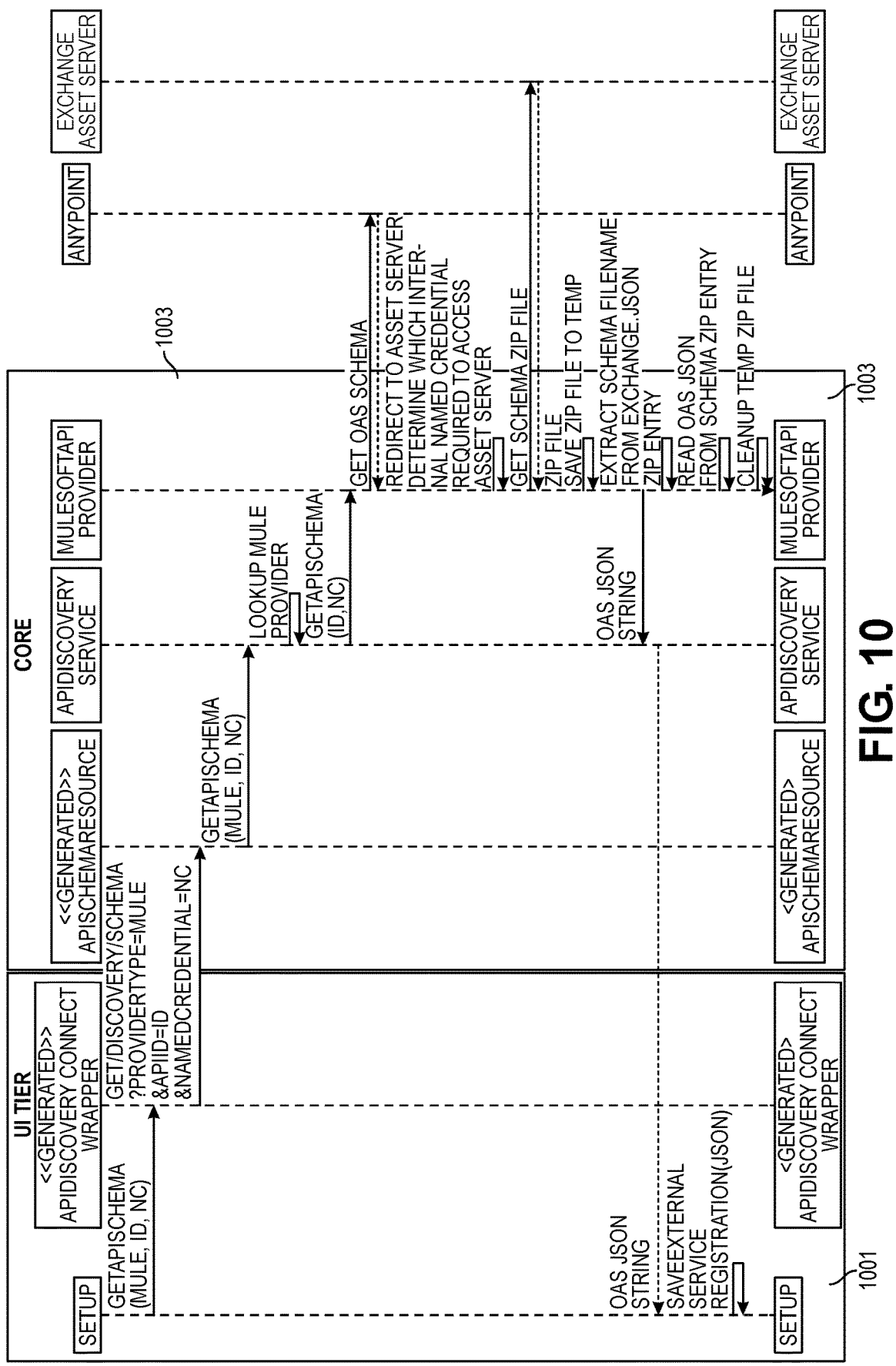
FIG. 10 is a flowchart of one embodiment of a process for fetching a schema.

FIG. 10 is a flowchart of one embodiment of a process for fetching an API schema. In the example, the user is selecting to import a MuleSoft API into the platform. The process is implemented by a UI tier (e.g., a separate UI module) 1001 and a core 1003 (e.g., an API manager). The UI tier 1001 can include a setup component that manages the interfaces for displaying options and collecting user selections for API integration. The setup component can receive API schema selection, determine the credential options and display them, then call an API discovery connect component ('getAPISchema') where the selected API source (e.g., 'mule'), identifier (id), and selected credential (e.g., 'nc') are provided as inputs. The API discovery connect generates a request to the core (e.g., GET/discovery/schema?providerType=mule&apid=id&namedCredential=nc). The APISchemaResource function receives the GET and in turn generates a request via a getAPISchema where the source ('mule'), application identifier (id), and named credential ('nc') are provided as inputs to an APIDiscovery service.

The API discovery service performs a lookup of the API source ('lookup Mule provider') and retrieves the API schemas from the API source ('getAPISchema(id, nc)'). In this example, the MuleSoftAPIProvider component an API source specific component in the core 1003 can service this request and interact with the API source, in this example 'Anypoint' server in a manner specific to the API source, as well as with an Exchange Asset Server. In the illustrated example, the core 1003 via the MuleSoftAPIProvider calls a 'get OAS schema' function and receives a redirection to the Exchange Asset Server. The MuleSoftAPIProvider then determines which internal named credential is required to access the asset server. The schema is then requested from the Exchange Asset Server (e.g., 'get schema ZIP file'). The returned ZIP file is then saved (e.g., to a temp location). The schema file can then be extracted (e.g., from exchang.json ZIP entry). The OAS JSON is ready from the schema ZIP entry and the OAS JSON is returned (and then temp ZIP file deleted) to the APIDiscoveryService, which in turn passes this information back to the setup component of the UI tier 901 to be displayed. The OAS JSON string or any subset thereof can then be displayed to the user for selection of the API operations for integration as well as specifics related to the functions, operations, objects, and other options related to the API to be integrated.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 11A:
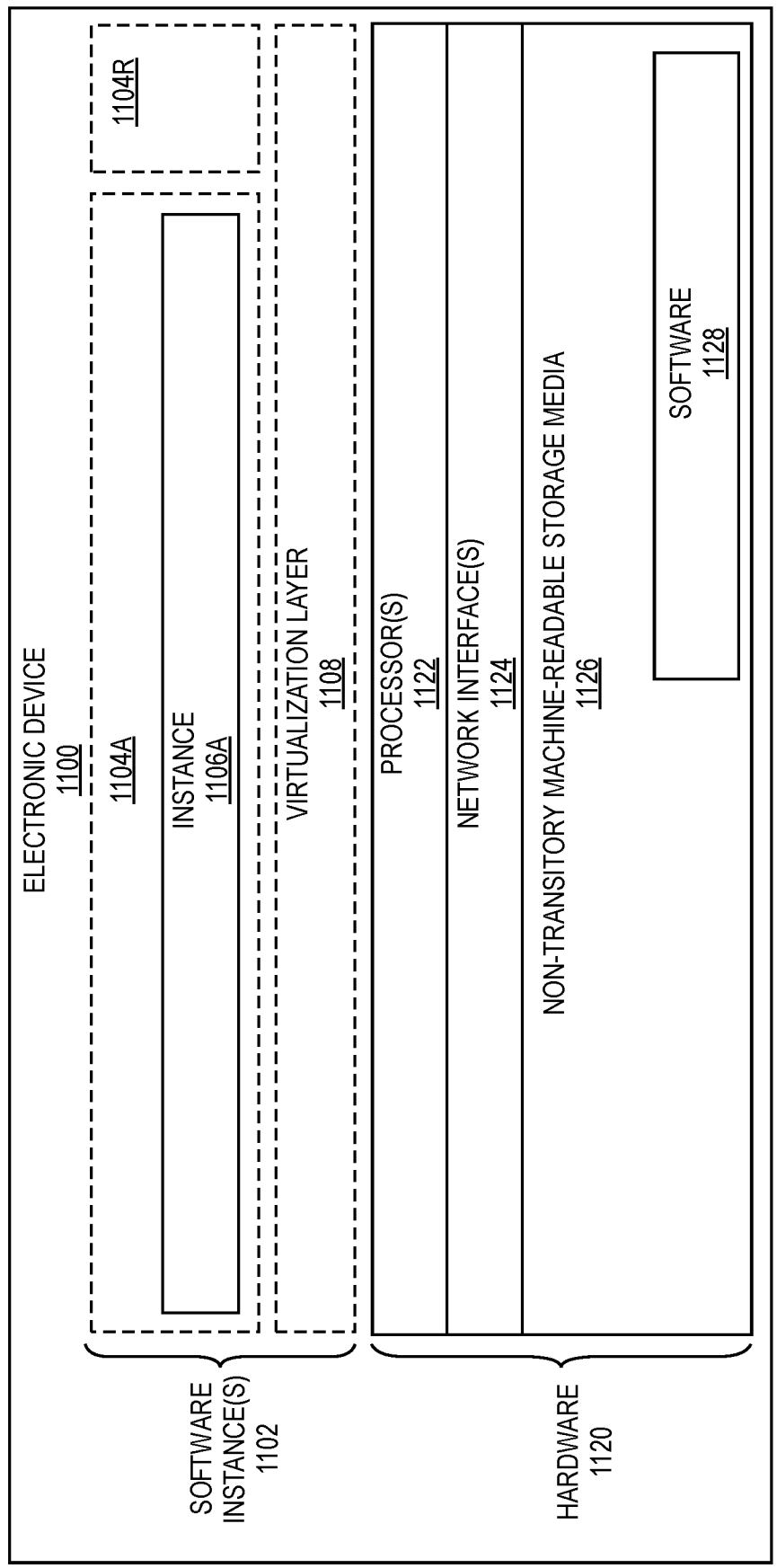
FIG. 11A is a block diagram illustrating an electronic device according to some example implementations.

FIG. 11A is a block diagram illustrating an electronic device 1100 according to some example implementations. FIG. 11A includes hardware 1120 comprising a set of one or more processor(s) 1122, a set of one or more network interfaces 1124 (wireless and/or wired), and machine-readable media 1126 having stored therein software 1128 (which includes instructions executable by the set of one or more processor(s) 1122). The machine-readable media 1126 may include non-transitory and/or transitory machine-readable media. Each of the previously described clients and the API manager service including associated components that implement the API integration such as the UI component may be implemented in one or more electronic devices 1100. In one implementation: 1) each of the clients is implemented in a separate one of the electronic devices 1100 (e.g., in end user devices where the software 1128 represents the software to implement clients to interface directly and/or indirectly with the API manager service (e.g., software 1128 represents a web browser, a native client, a portal, a command-line interface, and/or an application programming interface (API) based upon protocols such as Simple Object Access Protocol (SOAP), Representational State Transfer (REST), etc.)); 2) the API manager service is implemented in a separate set of one or more of the electronic devices 1100 (e.g., a set of one or more server devices where the software 1128 represents the software to implement the API manager service); and 3) in operation, the electronic devices implementing the clients and the API manager service would be communicatively coupled (e.g., by a network) and would establish between them (or through one or more other layers and/or or other services) connections for submitting API integration requests to the API manager service and returning action lists to the clients as well as enabling the selected API services for the clients. Other configurations of electronic devices may be used in other implementations (e.g., an implementation in which the client and the API manager service are implemented on a single one of electronic device 1100).

During operation, an instance of the software 1128 (illustrated as instance 1106 and referred to as a software instance; and in the more specific case of an application, as an application instance) is executed. In electronic devices that use compute virtualization, the set of one or more processor(s) 1122 typically execute software to instantiate a virtualization layer 1108 and one or more software container(s) 1104A-1104R (e.g., with operating system-level virtualization, the virtualization layer 1108 may represent a container engine (such as Docker Engine by Docker, Inc. or rkt in Container Linux by Red Hat, Inc.) running on top of (or integrated into) an operating system, and it allows for the creation of multiple software containers 1104A-1104R (representing separate user space instances and also called virtualization engines, virtual private servers, or jails) that may each be used to execute a set of one or more applications; with full virtualization, the virtualization layer 1108 represents a hypervisor (sometimes referred to as a virtual machine monitor (VMM)) or a hypervisor executing on top of a host operating system, and the software containers 1104A-1104R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1128 is executed within the software container 1104A on the virtualization layer 1108. In electronic devices where compute virtualization is not used, the instance 1106 on top of a host operating system is executed on the "bare metal" electronic device 1100. The instantiation of the instance 1106, as well as the virtualization layer 1108 and software containers 1104A-1104R if implemented, are collectively referred to as software instance(s) 1102.

Alternative implementations of an electronic device may have numerous variations from that described above. For example, customized hardware and/or accelerators might also be used in an electronic device.

Example Environment

Figure 11B:
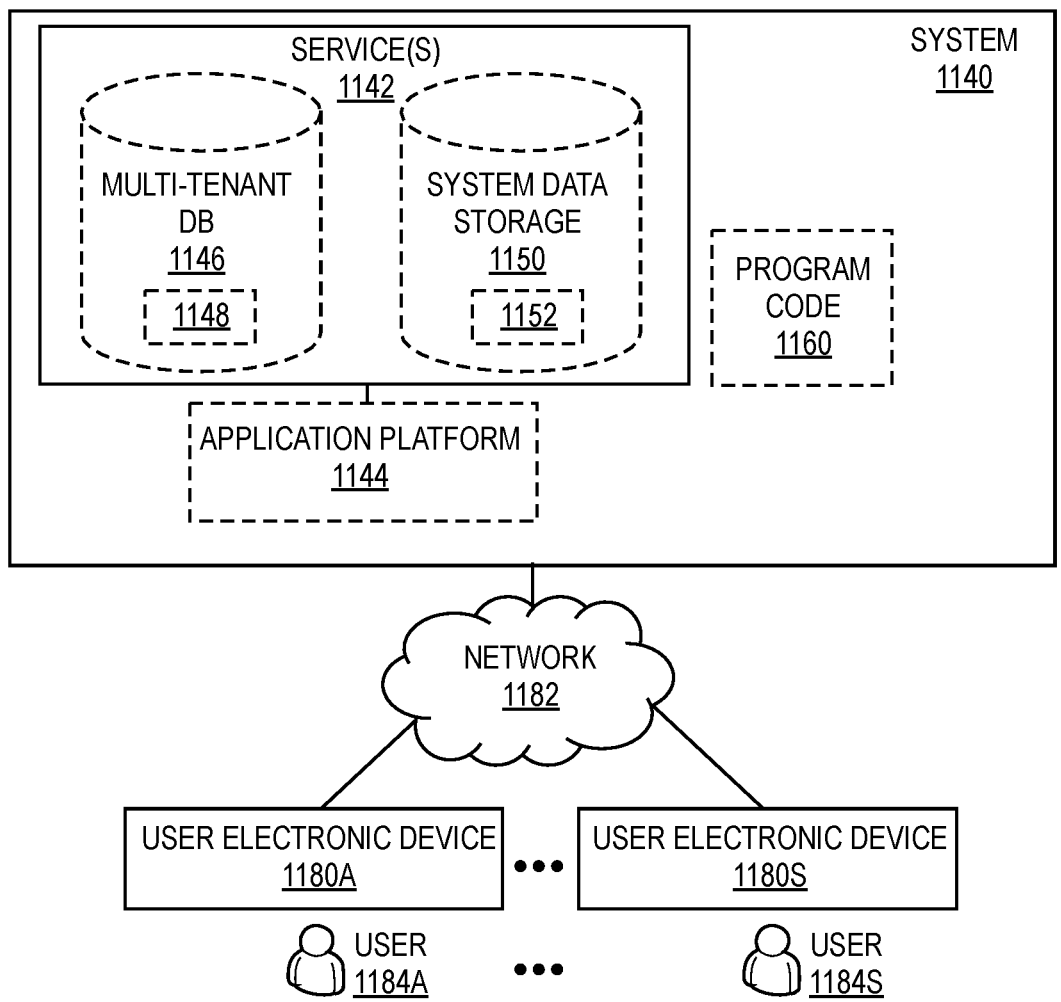
FIG. 11B is a block diagram of a deployment environment according to some example implementations.

FIG. 11B is a block diagram of a deployment environment according to some example implementations. A system 1140 includes hardware (e.g., a set of one or more server devices) and software to provide service(s) 1142, including the API manager service. In some implementations the system 1140 is in one or more datacenter(s). These datacenter(s) may be:

1) first party datacenter(s), which are datacenter(s) owned and/or operated by the same entity that provides and/or operates some or all of the software that provides the service(s) 1142; and/or 2) third-party datacenter(s), which are datacenter(s) owned and/or operated by one or more different entities than the entity that provides the service(s) 1142 (e.g., the different entities may host some or all of the software provided and/or operated by the entity that provides the service(s) 1142). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 1140 is coupled to user devices 1180A-1180S over a network 1182. The service(s) 1142 may be on-demand services that are made available to one or more of the users 1184A-1184S working for one or more entities other than the entity which owns and/or operates the on-demand services (those users sometimes referred to as outside users) so that those entities need not be concerned with building and/or maintaining a system, but instead may make use of the service(s) 1142 when needed (e.g., when needed by the users 1184A-1184S). The service(s) 1142 may communicate with each other and/or with one or more of the user devices 1180A-1180S via one or more APIs (e.g., a REST API). In some implementations, the user devices 1180A-1180S are operated by users 1184A-1184S, and each may be operated as a client device and/or a server device. In some implementations, one or more of the user devices 1180A-1180S are separate ones of the electronic device 1100 or include one or more features of the electronic device 1100.

In some implementations, the system 1140 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 1140 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 1140 may include an application platform 1144 that enables PAAS for creating, managing, and executing one or more applications developed by the provider of the application platform 1144, users accessing the system 1140 via one or more of user devices 1180A-1180S, or third-party application developers accessing the system 1140 via one or more of user devices 1180A-1180S.

In some implementations, one or more of the service(s) 1142 may use one or more multi-tenant databases 1146, as well as system data storage 1150 for system data 1152 accessible to system 1140. In certain implementations, the system 1140 includes a set of one or more servers that are running on server electronic devices and that are configured to handle requests for any authorized user associated with any tenant (there is no server affinity for a user and/or tenant to a specific server). The user devices 1180A-1180S communicate with the server(s) of system 1140 to request and update tenant-level data and system-level data hosted by system 1140, and in response the system 1140 (e.g., one or more servers in system 1140) automatically may generate one or more Structured Query Language (SQL) statements (e.g., one or more SQL queries) that are designed to access the desired information from the multi-tenant database(s) 1146 and/or system data storage 1150.

In some implementations, the service(s) 1142 are implemented using virtual applications dynamically created at run time responsive to queries from the user devices 1180A-1180S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1160 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1144 includes an application setup mechanism that supports application developers' creation and management of applications, which may be saved as metadata by save routines. Invocations to such applications, including the API manager service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1182 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 1140 and the user devices 1180A-1180S.

Each user device 1180A-1180S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1140. For example, the user interface device can be used to access data and applications hosted by system 1140, and to perform searches on stored data, and otherwise allow one or more of users 1184A-1184S to interact with various GUI pages that may be presented to the one or more users 1184A-1184S. User devices 1180A-1180S might communicate with system 1140 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 1180A-1180S might include an HTTP client, commonly referred to as a "browser," for sending and receiving HTTP messages to and from server(s) of system 1140, thus allowing users 1184A-1184S of the user devices 1180A-1180S to access, process and view information, pages and applications available to it from system 1140 over network 1182.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method comprising:
   receiving, from a user of a cloud-based software development platform, a selection of at least one application programming interface (API) provider service of a set of API provider services with API integration support for the software development platform;
   retrieving a listing of APIs provided by the selected at least one API provider service;
   receiving a selection of at least one API from the listing of APIs;
   displaying a graphical user interface including at least a listing of operations included in the at least one API;

receiving, via the graphical user interface, a selection of one or more operations in the listing of operations included in the at least one API; and causing the one or more operations, instead of all of the operations, to be integrated into the software development platform for users of the platform to develop software on the platform that includes the one or more operations.

2. The method of claim 1, further comprising:
displaying the set of API provider services via a user interface of the platform.

3. The method of claim 1, further comprising:
processing information for the listing of APIs retrieved from the selected at least one API provider service to identify a listing of input and output parameters for endpoints of the selected at least one API.

4. The method of claim 3, further comprising:
displaying the listing of input and output parameters for the selected at least one API to the user.

5. The method of claim 1, further comprising:
receiving at least one credential from a user along with the selection of the at least one API provider service.

6. The method of claim 5, further comprising:
providing the at least one credential to the selected at least one API provider service to retrieve the listing of APIs.

7. The method of claim 1, wherein the platform is a multi-tenant system and the user is a user of a tenant of the multi-tenant system.

8. A non-transitory machine-readable storage medium that provides instructions that, if executed by a set of one or more processors, are configurable to cause the set of one or more processors to perform operations comprising:
receiving, from a user of a cloud-based software development platform, a selection of at least one application programming interface (API) provider service of a set of API provider services with API integration support for the software development platform;
retrieving a listing of APIs provided by the selected at least one API provider service;
receiving a selection of at least one API from the listing of APIs;
displaying a graphical user interface including at least a listing of operations included in the at least one API;
receiving, via the graphical user interface, a selection of one or more operations in the listing of operations included in the at least one API; and
causing the one or more operations, instead of all of the operations, to be integrated into the software development platform for users of the platform to develop software on the platform that includes the one or more operations.

9. The non-transitory machine-readable storage medium of claim 8, having further instructions stored therein to cause the set of one or more processors to perform further operations comprising:
displaying the set of API provider services via a user interface of the platform.

10. The non-transitory machine-readable storage medium of claim 8, having further instructions stored therein to cause the set of one or more processors to perform further operations comprising:
processing information for the listing of APIs retrieved from the selected at least one API provider service to identify a listing of input and output parameters for endpoints of the selected at least one API.

11. The non-transitory machine-readable storage medium of claim 10, having further instructions stored therein to cause the set of one or more processors to perform further operations comprising:
displaying the listing of input and output parameters for the selected at least one API to the user.

12. The non-transitory machine-readable storage medium of claim 8, having further instructions stored therein to cause the set of one or more processors to perform further operations comprising:
receiving at least one credential from a user along with the selection of the at least one API provider service.

13. The non-transitory machine-readable storage medium of claim 12, having further instructions stored therein to cause the set of one or more processors to perform further operations comprising:
providing the at least one credential to the selected at least one API provider service to retrieve the listing of APIs.

14. The non-transitory machine-readable storage medium of claim 8, wherein the platform is a multi-tenant system, and the user is a user of a tenant of the multi-tenant system.

15. An apparatus comprising:
a non-transitory machine-readable storage medium that stores software; and
a set of one or more processors, coupled to the non-transitory machine-readable storage medium, to execute the software that implements an application programming interface (API) integration service and that is configurable to:
receive, from a user of a cloud-based software development platform, a selection of at least one application programming interface (API) provider service of a set of API provider services with API integration support for the software development platform;
retrieve a listing of APIs provided by the selected at least one API provider service;
receive a selection of at least one API from the listing of APIs;
display a graphical user interface including at least a listing of operations included in the at least one API;
receive, via the graphical user interface, a selection of one or more operations in the listing of operations included in the at least one API; and
cause the one or more operations, instead of all of the operations, to be integrated into the software development platform for users of the platform to develop software on the platform that includes the one or more operations.

16. The apparatus of claim 15, wherein the API service is further configured to:
display the set of API provider services via a user interface of the platform.

17. The apparatus of claim 15, wherein the API service is further configured to:
process information for the listing of APIs retrieved from the selected at least one API provider service to identify a listing of input and output parameters for endpoints of the selected at least one API.

18. The apparatus of claim 17, wherein the API service is further configured to:
display the listing of input and output parameters for the selected at least one API to the user.

19. The apparatus of claim 15, wherein the API service is further configured to:
receive at least one credential from a user along with the selection of the at least one API provider service.

20. The apparatus of claim 19, wherein the API service is further configured to:
    provide the at least one credential to the selected at least one API provider service to retrieve the listing of APIs.

21. The apparatus of claim 15, wherein the platform is a multi-tenant system, and the user is a user of a tenant of the multi-tenant system.

\* \* \* \* \*